(12) United States Patent
Pinette et al.

(10) Patent No.: US 11,232,394 B1
(45) Date of Patent: Jan. 25, 2022

(54) JUST-IN-TIME PACKAGE ROUTING AND DELIVERY

(71) Applicant: Amazon Technologies, Inc., Seattle, WA (US)

(72) Inventors: Philip Pinette, Seattle, WA (US); Brandon C. Adams, Auburn, WA (US); Daniel R. Dole, Seattle, WA (US); Kathleen Ann Mitchell Gavenman, Seattle, WA (US); Alexis N. Miller, Seattle, WA (US); Wesley Scott Lauka, Seattle, WA (US); Kristin L. Turner, Seattle, WA (US); Joseph D. Wolff, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 268 days.

(21) Appl. No.: 15/861,250

(22) Filed: Jan. 3, 2018

(51) Int. Cl.
| | |
|---|---|
| *G06Q 10/08* | (2012.01) |
| *H04L 29/08* | (2006.01) |
| *G06N 20/00* | (2019.01) |
| *G06F 16/435* | (2019.01) |
| *G06F 16/907* | (2019.01) |

(52) U.S. Cl.
CPC ....... *G06Q 10/0838* (2013.01); *G06F 16/435* (2019.01); *G06F 16/907* (2019.01); *G06N 20/00* (2019.01); *H04L 67/18* (2013.01); *G06Q 10/0832* (2013.01)

(58) Field of Classification Search
CPC ............ G06Q 10/0832; G06Q 10/0838; G06F 16/435; G06F 16/907; G06N 20/00; H04L 67/18
USPC ........................................................ 705/330
See application file for complete search history.

(56) References Cited

U.S. PATENT DOCUMENTS

| | | | | |
|---|---|---|---|---|
| 7,610,224 | B2 * | 10/2009 | Spiegel | G06Q 10/083 705/28 |
| 8,983,894 | B2 * | 3/2015 | Cohen | G06F 16/951 707/722 |
| 9,269,103 | B1 * | 2/2016 | Kumar | G06Q 30/0605 |
| 10,402,775 | B2 * | 9/2019 | Lievens | G06Q 30/0207 |

(Continued)

OTHER PUBLICATIONS

Amazon Patents "Anticipatory Shipping—To start Sending Stuff Before You've Bought It," by Natasha Lomas, Jan. 18, 2014 (Year: 2014).*

*Primary Examiner* — George Chen
*Assistant Examiner* — Brian Adams Heflin
(74) *Attorney, Agent, or Firm* — Patterson + Sheridan, LLP

(57) ABSTRACT

Method and apparatus for controlling delivery of an item. An electronic order specifying the item is received. An item profile for the first item is retrieved. A first instance of positional data for the user and a pattern of delivery preferences of the user are determined. Embodiments determine a first location for delivering the package to the user, based on the item profile, the first instance of positional data for the user and the pattern of delivery preferences of the first user. Shipment of the first item towards the first location is initiated, and based on subsequent network communications with an electronic device associated with the user, a second instance of positional data is determined. Delivery of the first item is facilitated to one of the first location corresponding to the first instance of positional data and a second location corresponding to the instance of positional data.

20 Claims, 8 Drawing Sheets

(56) References Cited

U.S. PATENT DOCUMENTS

| | | | | |
|---|---|---|---|---|
| 10,929,913 B2* | 2/2021 | Grimes | ............. | G06Q 30/0631 |
| 2002/0120935 A1* | 8/2002 | Huber | ................... | G06Q 30/06 |
| | | | | 725/60 |
| 2003/0220848 A1* | 11/2003 | Behrendt | ............... | G06Q 10/08 |
| | | | | 705/28 |
| 2010/0235210 A1* | 9/2010 | Nadrotowicz, Jr. | ........................ | |
| | | | | G01C 21/3461 |
| | | | | 705/7.21 |
| 2014/0180959 A1* | 6/2014 | Gillen | ................ | G06Q 10/0833 |
| | | | | 705/341 |
| 2014/0244664 A1* | 8/2014 | Verma | ................... | G06Q 50/01 |
| | | | | 707/749 |
| 2015/0120094 A1* | 4/2015 | Kimchi | ................. | B64C 39/024 |
| | | | | 701/3 |
| 2015/0154559 A1* | 6/2015 | Barbush | ........... | G06Q 10/08355 |
| | | | | 705/338 |
| 2015/0170098 A1* | 6/2015 | Glasgow | ............ | G06Q 10/0834 |
| | | | | 705/334 |
| 2016/0148154 A1* | 5/2016 | Tibbs | ................. | G06Q 10/0836 |
| | | | | 705/338 |
| 2017/0364860 A1* | 12/2017 | Wilkinson | ......... | G06Q 10/0837 |
| 2018/0156923 A1* | 6/2018 | Berclaz | ................... | G01S 19/31 |
| 2019/0034877 A1* | 1/2019 | Cantrell | ............. | G05D 1/0291 |

* cited by examiner

JUST-IN-TIME PACKAGE ROUTING AND DELIVERY

BACKGROUND

The present invention relates to automated computer systems, and more specifically, to automated systems for dynamically controlling shipping information for an electronically purchased item.

Today there are many package carriers and billions of people shipping packages on a regular basis. Similarly, these transactions are shipped to a substantial number of different recipients and different delivery locations. This has resulted in an incalculable combination of delivery locations and preferences for shipping packages to a given user, particularly due to people and businesses today being more mobile than ever before. As a result, more customers are unable to receive deliveries when and where they want than ever before.

Moreover, in other situations, users will have to expend more effort to ensure that their items can be delivered to them when and where the users need the items. That is, it can be difficult for users to have the foresight to know where they will be when something is ready to be delivered, and is sometimes it is not possible for users to make such predictions, as the user's plans may change. This is especially true for customers and businesses that travel frequently, as packages shipped through conventional sources may arrive after the user has left his default location due to travel plans. In some cases, this can delay the user from receiving the item, and in order cases can cause an inconvenience to both the user and the shipping provider, as select items can only be delivered when the recipient is present. These difficulties are compounded by not every carrier and merchant allowing the delivery of packages to be changed while the package is in transit, and some carriers and merchants may require the user to expend substantial effort to effect such a change and may assess fees against the user based on such a change.

DETAILED DESCRIPTION

Figure 1:
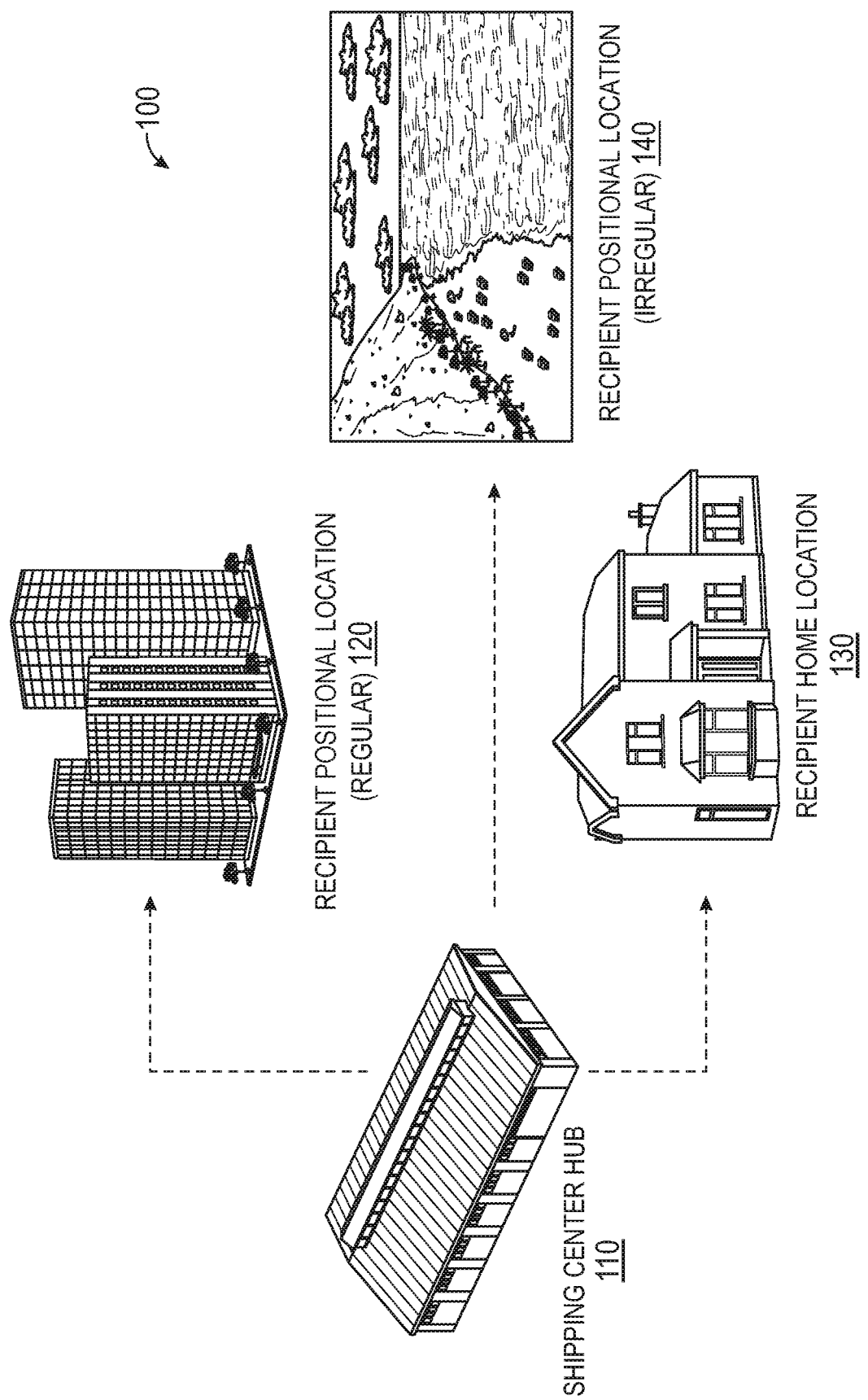
FIG. 1 is a diagram illustrating shipments of items for a user at various physical locations, according to one embodiment described herein.

As users today are more mobile than ever before, it is becoming increasingly challenging to deliver packages to users at an optimal location. For example, a user may wish to receive some packages as quickly as possible and thus may prefer to receive the package at locations outside of the user's residence. For instance, a user ordering a new mobile phone may wish to receive the device as quickly as possible, and thus may prefer to have the item delivered personally to the user, whether the user is at work, a café or at home. As another example, a user going on vacation could order an item specifically for the vacation (e.g., an order for a beach umbrella), and once the user has arrived at the vacation location, the user may wish to receive the item at the vacation location (e.g., as opposed to the user's house).

However, attempting to manage such shipping arrangements can be a hassle for the user, and this hassle is compounded by the policies of many shipping providers, who do not allow or restrict the ability of recipients to alter an item's delivery location, once the item is in transit. In other instances, shipping providers may assess a service charge for altering an item's delivery location, which may discourage the user from altering the item's delivery location and/or may negatively affect the user's online shopping experience.

As such, embodiments described herein provide techniques for shipping items to a dynamic location. For example, in one embodiment, items are shipped to a token address that is registered (e.g., with the online retailer) and that uniquely identifies the customer. The customer could then place online orders using their token address, and the system can dynamically determine the optimal location to deliver the ordered item(s) to. In some embodiments, the customer can use the token address with affiliated third-party shippers and merchants. The system can provide an interface through which the customer can manage their delivery preferences for all merchants and shipping providers who use the token address, rather than having to interact with the individual carriers and merchants. As a consequence, shippers using the token address would no longer need to know the customer's actual physical address to ship products to the customer, thereby helping maintain the customer's privacy.

Additionally, to ship items to another customer, a customer would only need to know one attribute about the other customer, such as their token name, to send an item to the other customer. As a result, customers would no longer need to manage an address book or to make sure that the addresses they have for their family and friends are still current. Rather, customers can specify the token address of the person they wish to ship an item to, and embodiments described herein can automatically manage the delivery of the item to the recipient. For example, embodiments described herein may facilitate the shipment of the item towards a region associated with the user (e.g., the user's city of residence) and the specific physical location where the item will be delivered can be dynamically determined shortly before the delivery of the item (e.g., on the day of delivery).

In one embodiment, warehouses could be distributed throughout the geographic region to serve as personal storage centers that customers or businesses do not ever have to visit. In such an example, each token address for a recipient could be associated with a respective personal storage bin, and items specifying a given token address could be delivered to the personal storage bin corresponding to the token address. The system could dynamically determine an optimal manner and location for delivering items from the personal storage bin to the recipient.

For example, in one embodiment, the system receives an electronic order specifying at least a first item to be delivered using a dynamic item delivery mechanism. The system could determine a first location corresponding to one or more electronic devices. As an example, a mobile device of the recipient could be configured with a software application that transmits location data (e.g., positional data determined using a Global Positioning System (GPS) transceiver) to the system. As a result, customers could receive packages wherever they are due to GPS or beaconing devices carried on their person, even if the customer's current physical location does not have a mailing address recognized by traditional shipping carriers (e.g., an area such as a park or a particular spot on the beach). By not requiring the item recipient to think about when he will be when the item is ultimately delivered and whether he will be able to receive packages at that location, creates more flexibility for people who have a more varied schedule, multiple addresses, and/or who move around regularly.

The system could determine whether to deliver the first item to the first location, based in part on evaluating metadata describing the first location and metadata describing attributes of the first item, in view of one or more predefined control rules for the dynamic item delivery mechanism. For example, the system could process the metadata describing the first location and the item attributes using a trained machine learning model, to determine a measure of likelihood that the first location is the optimal delivery location for the items. In doing so, the system could also consider an order history for the recipient of the items and historical delivery preferences of the recipient. If the system determines the first location is sufficiently likely to be the optimal delivery location (e.g., the determined measure of likelihood exceeds a predefined threshold measure of likelihood), the system could facilitate delivery of the first item to the first location. On the other hand, if the determined likelihood is not sufficiently high, the system could perform an alternate delivery action. Examples of such alternate actions include prompting the user to confirm whether the first location is the user's desired delivery location for the item, routing the delivery of the item to an alternate location, and so on. For instance, the system could calculate a confidence value for whether the item should be delivered to the recipient at their present location outside of the recipient's residence, and if the confidence value is not sufficiently high, the system could route the delivery of the item to the recipient's residence as a default delivery location.

In considering the metadata describing attributes of the first item, the machine learning model can be trained to construe the attributes of the first item in view of attributes of the first location. For example, the system could determine that a particular item is tagged with a "beach" metadata descriptor and could determine that this item is more likely to be optimally delivered at locations that are also tagged with the "beach" metadata descriptor. Additionally, the machine learning model could consider physical attributes of the first item, such as the physical dimensions of the package containing the first item, the weight of the package containing the first item, and so on. As an example, where the first location is classified as a residence, the system could determine that it is more likely to be optimal to deliver a larger item to the first location, as opposed to non-residential locations. As another example, where the system determines that the first location is the user's office, the system could determine that larger and/or heavier packages are not optimally delivered to such a location. More generally, however, the system can tailor the delivery preferences to each recipient's order history and explicitly indicated delivery preferences, consistent with the functionality described herein.

In one embodiment, the system could provide target addresses for unmanaged events (e.g., campaigns that are not controlled by a single person or business entity). For example, a target address could correspond to a relief program for a recent hurricane. Customers could then order packages and specify the target address for the hurricane relief effort as the destination address for the packages. The system could then route the packages to a shipping container corresponding to the hurricane relief effort, and the packages could ultimately be delivered to in accordance with delivery rules managed by the relief effort participants. For example, delivery rules could be defined that specify items of a particular type (e.g., perishable items, frozen items, food products, etc.) should be routed to a particular physical address, while other items should be delivered to a different physical address. Doing so allows for customers to send packages to support the relief program without having to be manually specify where the items need to be delivered, and moreover allows for the participants in the relief program to control where items of various types are most optimally delivered. Additionally, the use of such target address enables online merchants to effectively build out maps with more deliverable areas than are currently mapped by conventional sources, which can be especially useful in countries where addresses are less codified and often more direction-based. That is, by having the capability to deliver items to a user at a coordinate position, embodiments can deliver packages to users at locations that do not have a corresponding conventional street address.

FIG. 1 is a diagram illustrating shipments of items for a user at various physical locations, according to one embodiment described herein. As shown, FIG. 1 is a diagram 100 that illustrates a shipping center hub 110, as well as a recipient's home location 130, the recipient's positional location 120 at a first moment in time (e.g., determined based on one or more GPS coordinates for an electronic device corresponding to the user), and the recipient's positional location 140 at a second moment in time. In the depicted example, the positional location 120 represents a physical location that is regularly visited location by the recipient (e.g., the recipient's office), whereas the positional location 140 represents a physical location that is seldom visited by the recipient.

In determining how to deliver a particular package to the recipient, embodiments can first determine the user's physical location at a time shortly before the time of delivery. For example, assume that the system determines that the recipient is at the positional location 120, and that the recipient's user profile indicates the recipient frequently visits the positional location 120. Embodiments could then determine whether a particular item to be delivered is generally suitable for delivery to the recipient at a non-residential location (e.g., where the user is an individual, as opposed to a business customer). For example, embodiments could process physical attributes of the package being delivered, such as the package's physical dimensions and weight (e.g., as inputs to a machine learning model), to determine a likelihood that the item is optimally delivered to the positional location 120 where the user currently resides. As an example, a large package (e.g., a piece of furniture) may be ill-suited for delivery directly to the recipient at a location outside of the recipient's residence. As such, embodiments could route large packages directly to the user's residential address 130. As another example, embodiments could determine that a smaller package is more suitable for delivery directly to the recipient at the positional location 120.

Additionally, embodiments can consider attributes of the item being delivered in determining the optimal delivery location. As an example, where embodiments determine that metadata describing the item indicate that the item is a perishable item (e.g., a frozen item), embodiments could be more likely to determine that the user's current positional location 120 is the optimal delivery location. Additionally, the system could consider metadata describing the user's current location, in determining whether to deliver the item directly to the user. For example, where the system determines that the user is at the positional location 140, a location that is infrequently visited by the user, the system could access metadata describing the positional location 140 and could determine that the positional location 140 is classified as a beach location. If the system then determines that the item being delivered has a predefined association with beach locations, the system could determine that it is more likely that the positional location 140 is the optimal delivery location for the item. As an example, if the user is away on a beach vacation at the positional location 140 and orders sunscreen from the online retailer, embodiments described herein could process metadata describing the positional location 140 and metadata describing the sunscreen item using a trained machine learning model, in order to determine that the sunscreen is likely to be optimally delivered directly to the user at the positional location 140, as opposed delivering the item to the user's residential address 130.

Figure 2:
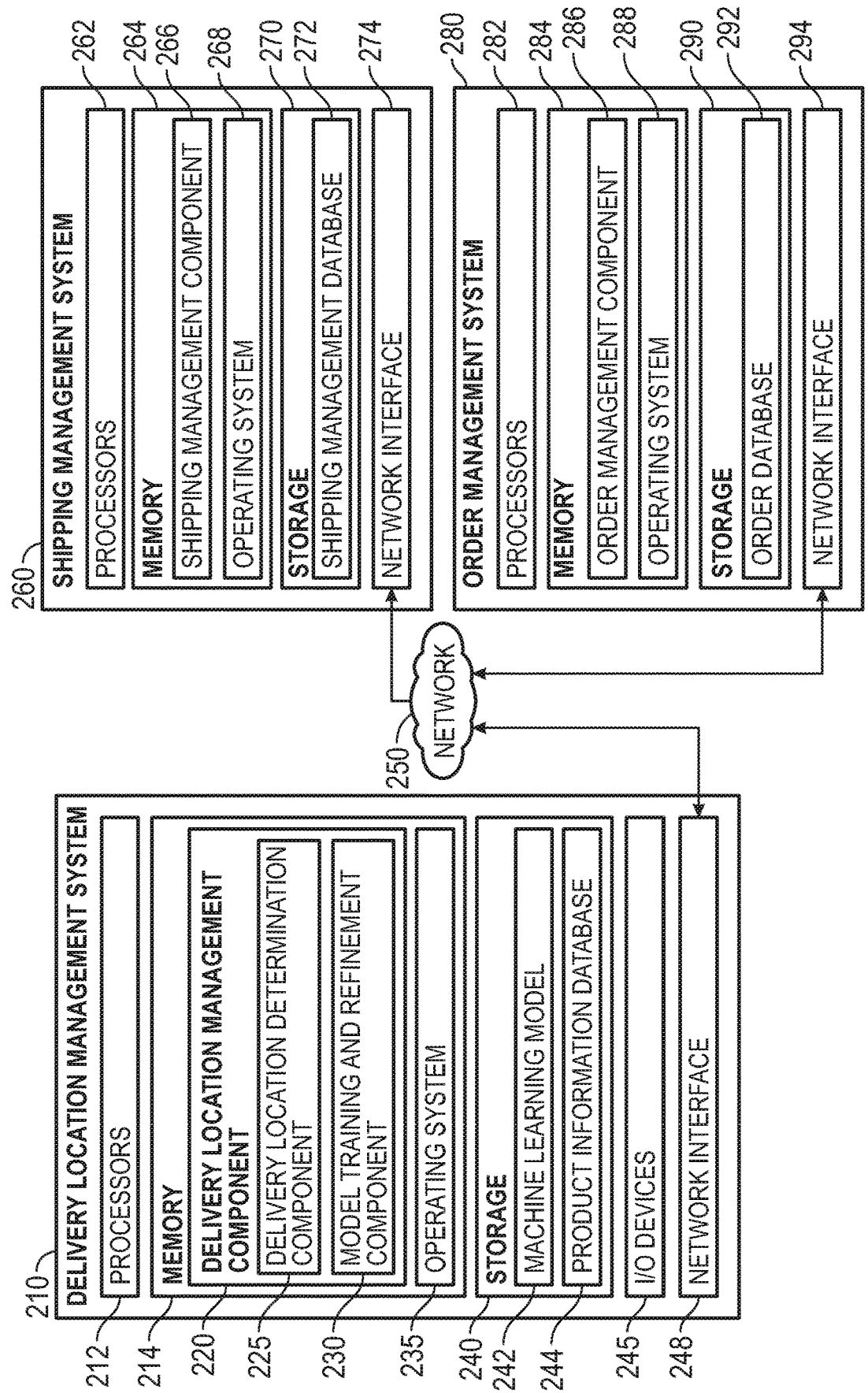
FIG. 2 is a block diagram illustrating a system configured with a delivery location management component, according to one embodiment described herein.

FIG. 2 is a block diagram illustrating a system configured with a delivery location management component, according to one embodiment described herein. As shown, the system 200 includes a delivery location management system 210, a shipping management system 260 and an order management system 280, all connected via a network 250.

The delivery location management system 210 includes a processor 212, memory 214, storage 240, I/O devices 245, and a network interface 248. Processor 212 is intended to be representative of a single CPU, multiple CPUs, a single CPU having multiple processing cores, and the like. The memory 214 is included to be representative of a random access memory. As shown, memory 214 includes the delivery location management component 220 and an operating system 235. The delivery location management component 220 includes a delivery location determination component 225 and a model training and refinement component 230. Storage 240 includes a machine learning model 242 and a product information database 244. Generally, the product information database 244 contains metadata describing various products sold by one or more online merchants. Such metadata could specify, for example, physical dimensions of the products, weights of the products, description tags associated with the product (e.g., a beach item, an educational item, a cosmetics item, a food or otherwise perishable item, etc.). The storage 240 may be a disk drive storage device. Although shown as a single unit, the storage 240 may be a combination of a fixed and/or removable storage, such as fixed disc drives, removable memory cards, optical storage, network attached storage (NAS), or storage-area-network (SAN). The network interface 248 may be any type of network communications allowing the delivery location management system 210 to communicate with other computers via a data communications network (e.g., network 250).

The shipping management system 260 includes a processor 262, memory 264, storage 270, and a network interface 274. Processor 262 is intended to be representative of a single CPU, multiple CPUs, a single CPU having multiple processing cores, and the like. The memory 264 is included to be representative of a random access memory. As shown, memory 264 includes the shipping management component 266 and an operating system 268. Storage 270 includes a shipping management database 272. Generally, the shipping management database 272 contains data used in the management of shipping products to specified destinations. Such data could specify, for example, a current location of a given package, a location history of the package, timing information for when the package was scanned at various locations, an estimated time of delivery for the package, physical dimensions corresponding to the package, a weight of the package, and so on. The storage 270 may be a disk drive storage device. Although shown as a single unit, the storage 270 may be a combination of a fixed and/or removable storage, such as fixed disc drives, removable memory cards, optical storage, network attached storage (NAS), or storage-area-network (SAN). The network interface 274 may be any type of network communications allowing the shipping management system 260 to communicate with other computers via a data communications network (e.g., network 250).

The order management system 280 includes a processor 282, memory 284, storage 290, and a network interface 294. Processor 282 is intended to be representative of a single CPU, multiple CPUs, a single CPU having multiple processing cores, and the like. The memory 284 is included to be representative of a random access memory. As shown, memory 284 includes the order management component 286 and an operating system 288. Storage 290 includes an order database 292, which generally contains data describing orders for products placed at an online retailer. For example, the order database 292 could specify a recipient for each order, information describing who placed the other, products included in the order, an amount charged for each item in the order, and so on. The storage 290 may be a disk drive storage device. Although shown as a single unit, the storage 290 may be a combination of a fixed and/or removable storage, such as fixed disc drives, removable memory cards, optical storage, network attached storage (NAS), or storage-area-network (SAN). The network interface 294 may be any type of network communications allowing the order management system 280 to communicate with other computers via a data communications network (e.g., network 250).

In one embodiment, the delivery location management component 220 could receive an electronic order specifying at least a first item to be delivered. For example, the delivery location management component 220 could receive the electronic order from the order management system 280, and the electronic order could have been placed using a graphical user interface provided by the online retailer. Upon receiving the order, the delivery location determination component 225 could initiate delivery of the first item towards a first determined location, based at least in part on one or more delivery preferences specified in a user profile. For example, the delivery location determination component 225 could determine that the delivery preferences indicate that the user has opted into dynamic location delivery services from the online retailer, and the delivery location determination component 225 could determine a region in which the user is located. In doing so, the delivery location determination component 225 could consider a default address (e.g., the user's residential address) for the user, and could determine a region in which the default address is located. As another example, the delivery location determination component 225 could transmit instructions to a client device carried by the user and could request coordinate positioning data corresponding to the user's current physical location from the client device. The delivery location determination component 225 could then determine a region in which the coordinate positioning data is located.

In some instances, the delivery location determination component 225 could determine that the item is optimally delivered to the user's residential address, and thus could route the first item to the user's home address through conventional shipping channels. Such a determination could be optimal, for example, when the item being delivered is sufficiently large or heavy, such that delivery of the item to the user's person would likely be a substantial inconvenience for the user. In other cases, however, the delivery location determination component 225 could dynamically route the item to a different location, prior to the delivery of the first item.

For instance, the delivery location determination component 225 could reroute delivery of the first item to a second determined location, based at least in part on positional data corresponding to one or more electronic devices. For example, the delivery location determination component 225 could process metadata describing the item and metadata describing the user's current GPS location as inputs to a trained machine learning model to determine a likelihood that the user's current GPS location is an optimal delivery location for the first item. In doing so, the delivery location determination component 225 could query the product information database 244 to retrieve the metadata describing the product being shipped. Likewise, the delivery location determination component 225 could process the metadata describing the item and metadata describing the first location (e.g., the user's default residence address) to determine a likelihood that the first location is an optimal delivery location for the first item. The delivery location determination component 225 could then compare the two likelihood values to determine which of the locations is more optimal for delivering the first item. For example, upon determining that the likelihood for the second location is substantially higher than the likelihood for the first location, the delivery location determination component 225 could route the package to the second location for delivery. In some instances, the delivery location determination component 225 could generate a prompt (e.g., on a mobile device associated with the recipient) to request that the recipient confirm the delivery of the item to either the first location or the second location.

In a particular embodiment, the delivery location determination component 225 is configured to receive an electronic order specifying at least a first item to be delivered to a user. The delivery location determination component 225 could retrieve an item profile for the first item, the item profile specifying at least one or more physical attributes of the first item and one or more metadata tags describing common uses of the first item. For example, the delivery location determination component 225 could query the product information database 244 to retrieve the item profile for the first item.

The delivery location determination component 225 could also determine, based on network communications with one or more electronic devices associated with the user, a first instance of positional data for the user. For example, the delivery location determination component 225 could transmit one or more instructions to a client device associated with the recipient, requesting current location information for the client device and, in response, the delivery location determination component 225 could receive coordinate positional information from the client device specifying the client device's current geographic position.

The delivery location determination component 225 could determine, based on a plurality of previous electronic orders, a pattern of delivery preferences of the user. For example, the delivery location determination component 225 could retrieve an order history of the user by submitting a query to the order database 292. The delivery location determination component 225 could then consider the pattern of delivery preferences of the recipient in dynamically determining a location for routing a package to the recipient. For example, if the pattern of delivery preferences indicates that the recipient has historically preferred to have a particular type of product (e.g., office supplies) shipped to a particular physical location (e.g., the user's office), the delivery location determination component 225 could determine that subsequently ordered products of the particular type are more likely to be optimally delivered to the particular physical location.

Additionally, the delivery location determination component 225 could determine a first location for delivering the package to the user, based on the item profile, the first instance of positional data for the user and the pattern of delivery preferences of the first user. For example, the delivery location determination component 225 could process information from the item profile, the positional data and the pattern of delivery preferences by a trained machine learning model, to determine that a first location is suitable for delivery of the item. The delivery location determination component 225 could then automatically initiate, by operation of one or more computer processors, a shipment of the first item towards the first location. For example, the delivery location determination component 225 could determine a region in which the first location is located and could update the shipping management database 272 to specify that the first item should be transmitted to the determined region. The shipping management component 266 could then use this information to facilitate the transmittal of the first item to a shipping facility in the determined region (e.g., by updating information that is displayed when a label on a package containing the first item is scanned to ensure the package is placed on the proper pallet).

The delivery location determination component 225 could subsequently determine, based on subsequent network communications with the one or more electronic devices associated with the user, a second instance of positional data for the user. For example, once the package reaches a shipping center within the region containing the first location, the delivery location determination component 225 could determine a current physical location of the user (e.g., by determining the coordinate position of one or more electronic devices carried by the user).

The delivery location determination component 225 could then determine whether the first location or the second location is more optimal for the delivery of the package containing the first item. For example, the delivery location determination component 225 could process the locations as inputs to a machine learning model, to determine a likelihood that each of the locations is an optimal delivery location for the user. In doing so, the delivery location determination component 225 could further consider the pattern of delivery preferences of the recipient, the item profile for the first item, and other metadata as additional inputs to the machine learning model. The delivery location determination component 225 could compare the determined likelihoods to select one of the multiple locations for delivering the item. Additionally, the delivery location determination component 225 could transmit a notification to a client application on one or more client devices carried by the recipient, informing the recipient of the determined delivery location. The client application could provide a graphical user interface, through which the recipient can confirm the delivery at the selected location or alter the location the item will be delivered to.

Figure 3A:
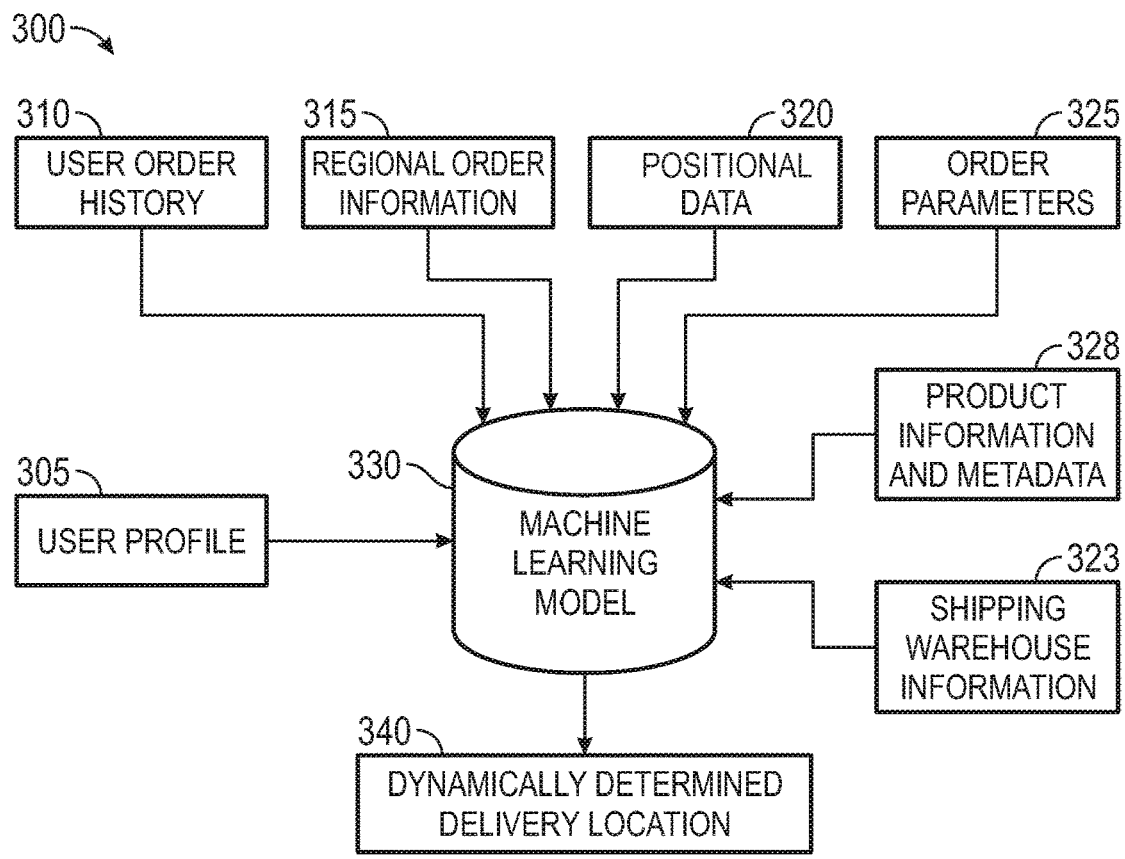
FIGS. 3A-B are block diagrams illustrating input data for dynamically determining delivery locations for ordered items, according to one embodiment described herein.
Figure 3B:
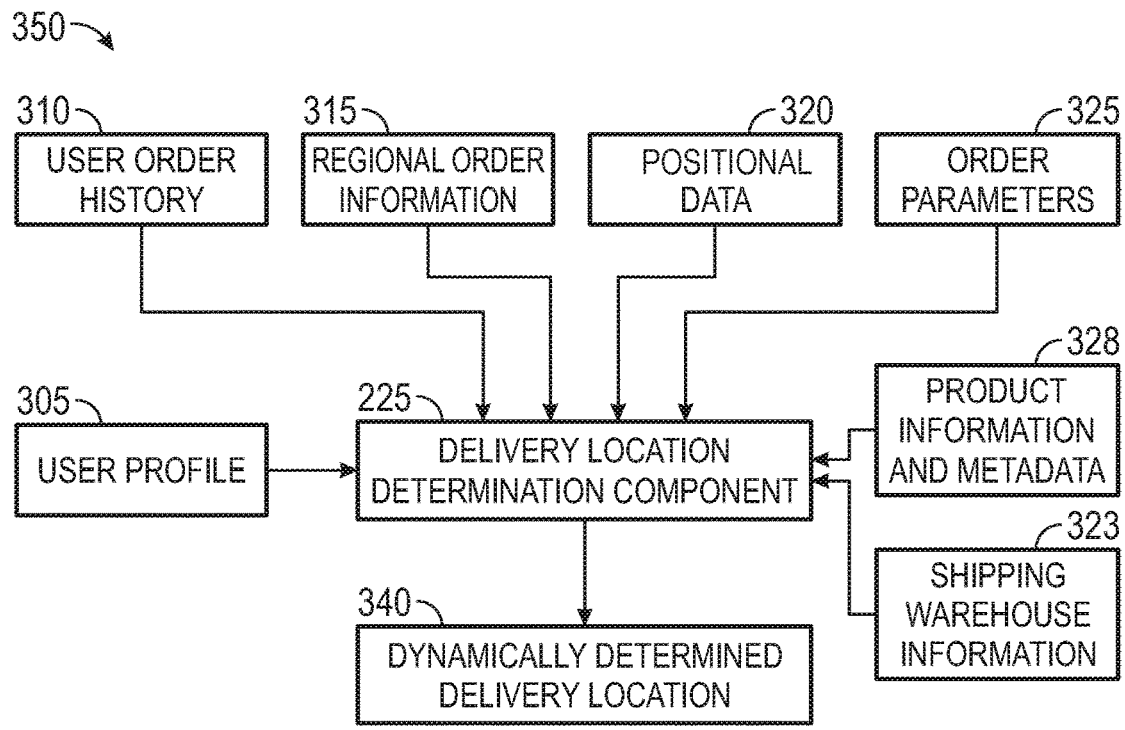

FIGS. 3A-B are block diagrams illustrating input data for dynamically determining delivery locations for ordered items, according to one embodiment described herein. As shown in FIG. 3A, the diagram 300 depicts a user profile 305, a user order history 310, regional order information 315, user positional data 320, order parameters 325, product information and metadata 328 and shipping warehouse information 323, as inputs to a machine learning model 330. The machine learning model 330, in turn, is configured to output a dynamically determined delivery location 340.

For example, the delivery location determination component 225 could parse the user order history 310 to determine a plurality of historical addresses to which the user has previously had packages delivered. Additionally, the delivery location determination component 225 could determine an address corresponding to the user positional data 320 received from one or more electronic devices associated with the recipient. The machine learning model 330 could consider these addresses and could select one of the addresses that is determined to be most optimal for the delivery of the package for the particular recipient. For example, neurons with the machine learning model could be configured to calculate a respective likelihood that each of the addresses is the optimal delivery location, and a subsequent layer within the machine learning model could be configured to select one of the addresses for the delivery of the package, based at least in part on the respective likelihoods for each of the addresses. As another example, the user profile 305 could specify one or more rules that can be used to automatically determine the optimal delivery location 340 for the package. For example, the user profile 305 could include a rule that specifies that all cleaning products should be shipped to the user's home address, and the machine learning model 330 could evaluate the product information and metadata 328 in view of such a rule to determine the delivery location 340. As another example, the user profile 305 could include another rule that specifies that no item over a certain size should be delivered to a specific location.

Additionally, the machine learning model 330 can consider shipping warehouse information 323 as an input to determine the delivery location 340. For example, the machine learning model 330 could determine a shipping warehouse from which the item is available based on the shipping warehouse information 323, and could further determine that due to the proximity between the shipping warehouse and the user's positional location 320, the item could be delivered to the user's positional location 320 a day faster than if the item is delivered to the user's home address. The machine learning model 330 could consider such information in determining the optimal delivery location 340 for the item. In one embodiment, the delivery location determination component 225 can transmit a notification to the user, informing the user of the potential to have the item delivered to a particular location faster than another location, and the user's selection of one of the two locations can be considered in determining the optimal delivery location (e.g., if the user chooses to receive the item as early as possible, the delivery location determination component 225 could determine to route the item to the user's positional location 320.

In one embodiment, the delivery location determination component 225 can consider other information within the user profile 305, such as one or more programs the user participates in. For instance, if the user participates in a program that allowed delivery personnel to deliver items to a secure location at a particular delivery address (e.g., inside the user's front door), such information could be processed as an input to the machine learning model 330 for use in determining the optimal delivery location. For example, when a high value item is being delivered, the machine learning model 330 could favor locations where the item can be delivered securely (e.g., as part of such a program, where the item is delivered personally to the user, etc.), as opposed to locations where the item may be unsecured for a period of time (e.g., where the item sits unsecured outside of the user's front door).

Rather than using a machine learning model 330, in one embodiment, the delivery location determination component 225 is configured with logic to evaluate various inputs to determine an optimal delivery location for an item. As shown in FIG. 3B, the diagram 350 depicts the user profile 305, a user order history 310, regional order information 315, user positional data 320, order parameters 325, product information and metadata 328 and shipping warehouse information 323, as inputs to the delivery location determination component 225. The delivery location determination component 225 can be configured to considering one or more of these inputs and to output a dynamically determined delivery location 340.

Figure 4:
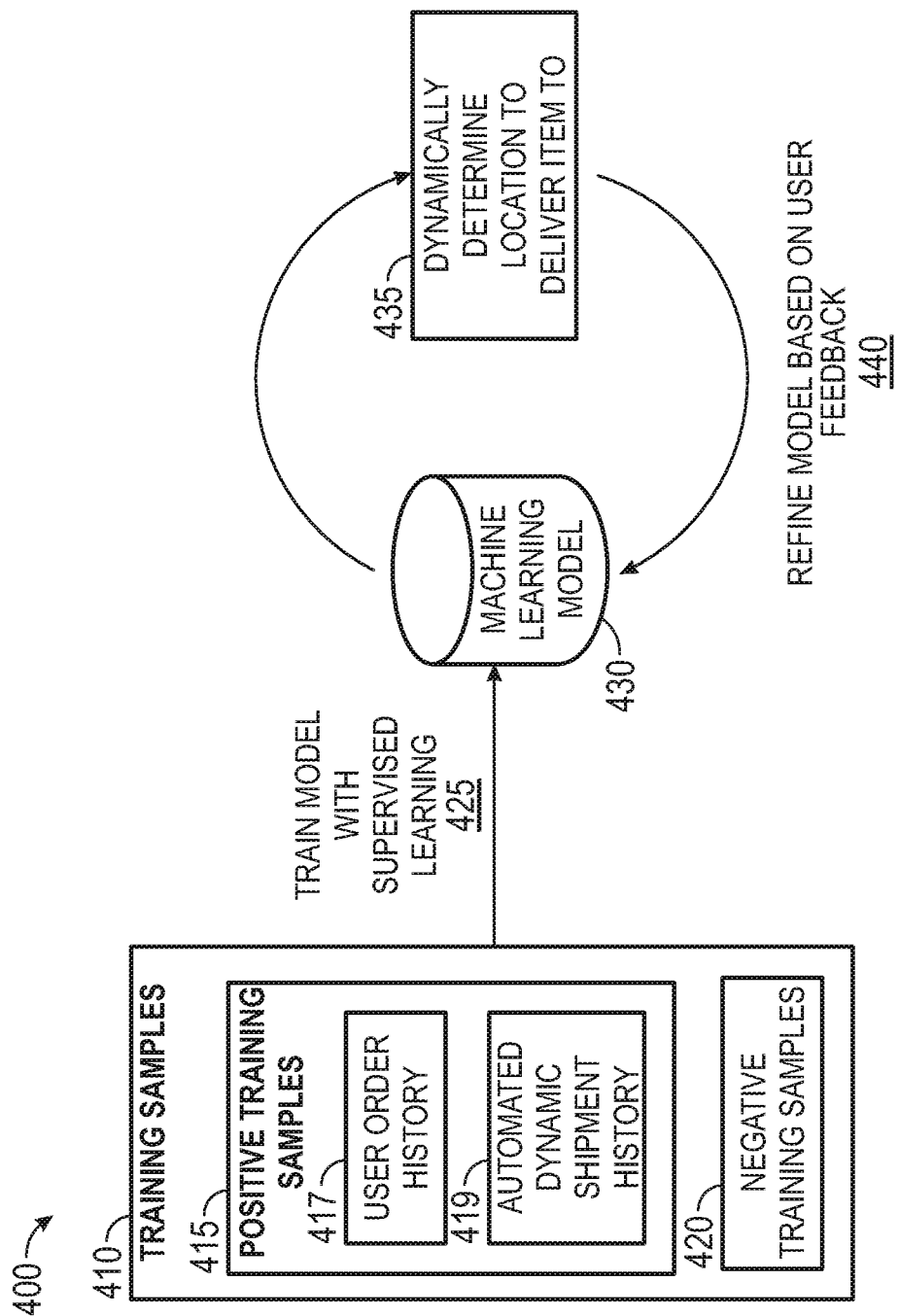
FIG. 4 is a block diagram illustrating a method for training and refining a machine learning model for dynamically determining delivery locations for ordered items, according to one embodiment described herein.

FIG. 4 is a block diagram illustrating a method for training and refining a machine learning model for dynamically determining delivery locations for ordered items, according to one embodiment described herein. As shown, the block diagram 400 depicts a plurality of training samples 410 that are used to train a machine learning model 430. The training samples 410, in the depicted embodiment, include a user order history 417, an automated dynamic shipment history for other users 419 and negative training samples 420. For example, the model training and refining component 230 could retrieve the user order history 417 from the order database 292, and could consider previous orders where the user manually specified that a particular item should be delivered to a particular address as positive training samples for the machine learning model 430. Additionally, the model training and refining component 230 can consider the automated dynamic shipment history for other users 419, e.g., instances where a package was delivered to a location dynamically determined by the delivery location determination component 225, and feedback was received from the recipient indicating that the determined address was the desired delivery address for the item. Additionally, the model training and refining component 230 can train the machine learning model 430 using a plurality of negative training samples 420. For example, the negative training samples 420 could include instances where a package was delivered to a location dynamically determined by the delivery location determination component 225, and feedback was received from the recipient indicating that the determined address was not the desired delivery address for the item.

Figure 5:
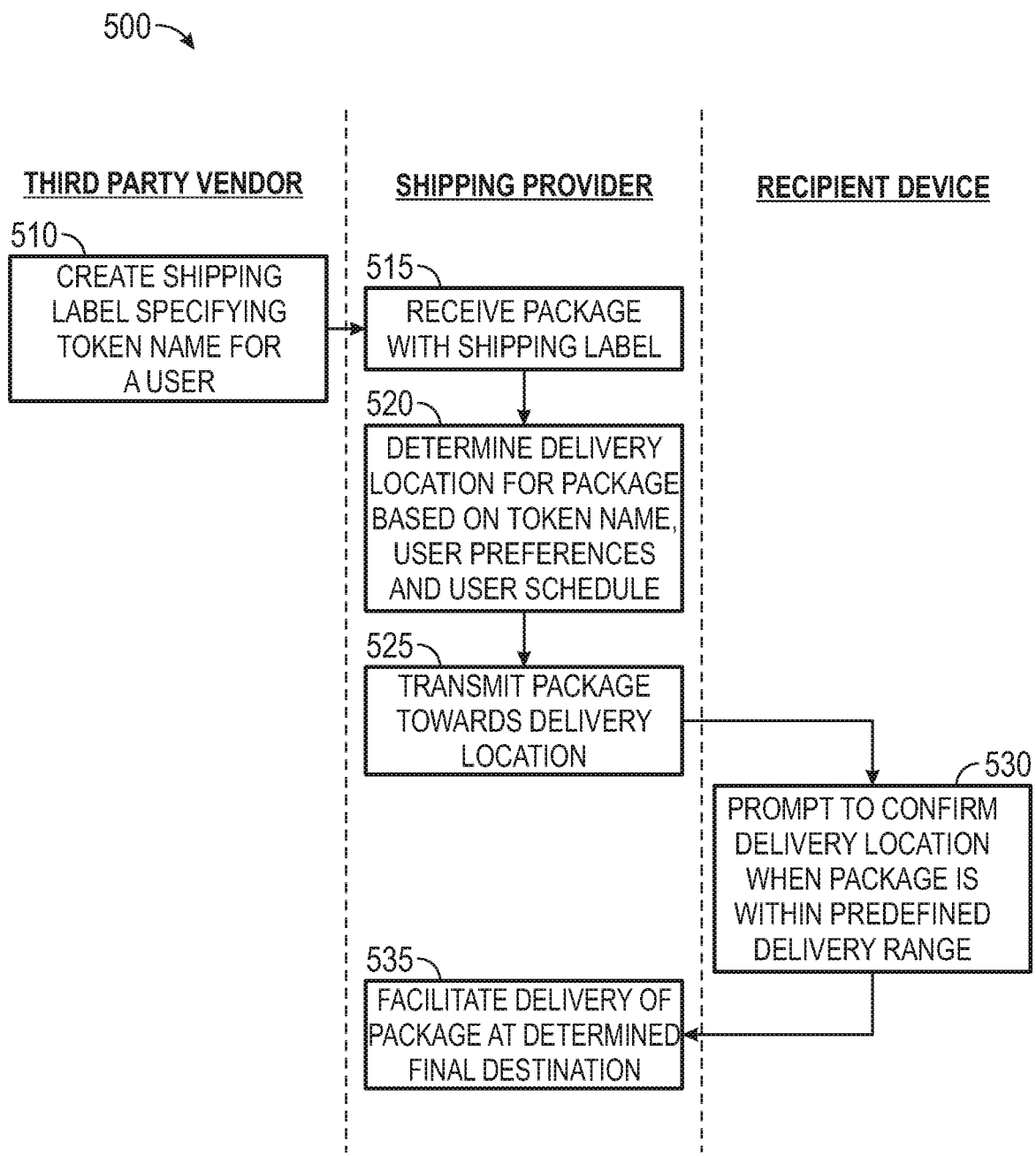
FIG. 5 is a flow diagram illustrating a method for delivering a package to a dynamically determined location, according to one embodiment described herein.

As discussed above, in some embodiment, a third party online retailer can use a token address on a label for a package to be delivered, and can then hand the package off to another retailer or shipping provider who can manage the delivery of the package to the recipient. FIG. 5 is a flow diagram illustrating a method for delivering a package to a dynamically determined location, according to one embodiment described herein. As shown, the method 500 begins at block 510, where a third party creates a shipping label for a package to be delivered to a recipient, where the shipping label specifies a token name for the recipient. Of course, one of ordinary skill in the art will recognize that the label can represent the token name in a number of different ways. For example, the label may specify the token name in text printed on the label. Additionally, the label could specify a bar code or QR code that can be scanned to determine the token name for the recipient. More generally, any way of marking the shipping label such that the token name can be retrieved can be used, consistent with the functionality described herein.

The shipping provider receives the package with the affixed shipping label (block 515) and the delivery location determination component 225 determines a delivery location for the package based on the token name on the shipping label, user preferences for the recipient and a schedule of the recipient (block 520). For example, the delivery location determination component 225 could access social media materials associated with the recipient (e.g., the recipient's electronic calendar, electronic messages sent and received by the recipient, social media site posts made by the recipient, etc.). More generally, any content that the recipient has authorized the delivery location determination component 225 to access can be considered, consistent with the functionality described herein.

Generally, the delivery location determination component 225 can consider information within the recipient's schedule in predicting delivery locations for delivering items to the recipient. For example, if the recipient's address book contains both a home residential address and a beach house residential address and if the delivery location determination component 225 determines that the recipient's schedule indicates that the user will be at the beach house on a given date, the delivery location determination component 225 could determine that the address for the recipient's beach house may be more optimal for the delivery of select packages.

The delivery location determination component 225 then facilitates the transmission of the package towards the determined delivery location (block 525). For example, upon determining to initially transmit the package to a particular address, the delivery location determination component 225 could facilitate the shipment of the package to a regional warehouse for a region in which the determined address is located. At some subsequent moment in time when the package is within a predefined delivery range (e.g., when the package arrives at the regional warehouse), the delivery location determination component 225 can transmit instructions to a recipient device, requesting to prompt the recipient to confirm the delivery location for the package (block 530). For example, an application installed on a mobile device associated with the recipient could output a user interface, prompting the user to affirm or reject the dynamically determined delivery location for the package. The delivery location determination component 225 then facilitates the delivery of the package to a determined final destination. For example, where the recipient affirmed the originally determined delivery location, the delivery location determination component 225 could facilitate the delivery of the package to the original location. On the other hand, where the recipient rejected the originally determined location, the delivery location determination component 225 could determine a different delivery location (e.g., based on a selection of an address made by the recipient on the recipient device) to deliver the package to.

Figure 6:
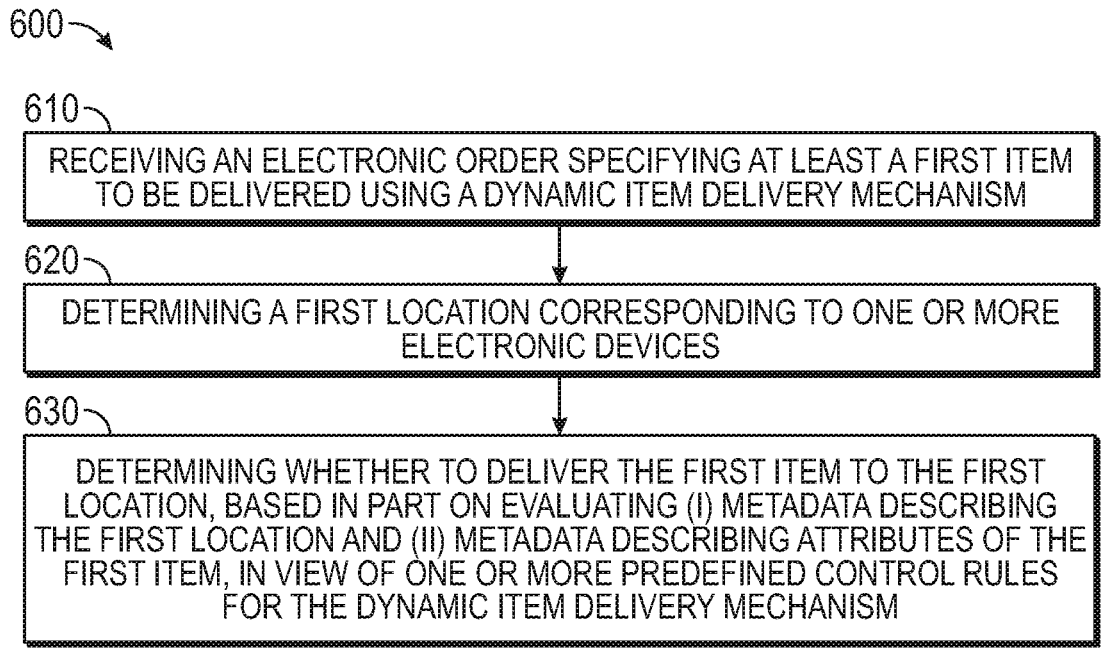
FIG. 6 is a flow diagram illustrating a method for determining whether to deliver a package to a location dynamically determined based on a position of one or more electronic devices, according to one embodiment described herein.

FIG. 6 is a flow diagram illustrating a method for determining whether to deliver a package to a location dynamically determined based on a position of one or more electronic devices, according to one embodiment described herein. As shown, the method 600 begins at block 610, where the delivery location determination component 225 receives an electronic order specifying at least a first item to be delivered using a dynamic item delivery mechanism. The delivery location determination component 225 determines a first location corresponding to one or more electronic devices (block 620). For example, the delivery location determination component 225 could receive GPS coordinate data from the one or more electronic devices, indicating a current geographic position of the electronic device(s).

The delivery location determination component 225 determines whether to deliver the first item to the first location, based in part on evaluating (i) metadata describing the first location and (ii) metadata describing attributes of the first item, in view of one or more predefined control rules for the dynamic item delivery mechanism (block 630). For example, the delivery location determination component 225 could process the metadata for the first item and the first location, as well as other contextual data for the delivery of the first item to the recipient, as inputs to a machine learning model, to determine a likelihood that the first location is an optimal location for delivery of the item to the first user.

Figure 7:
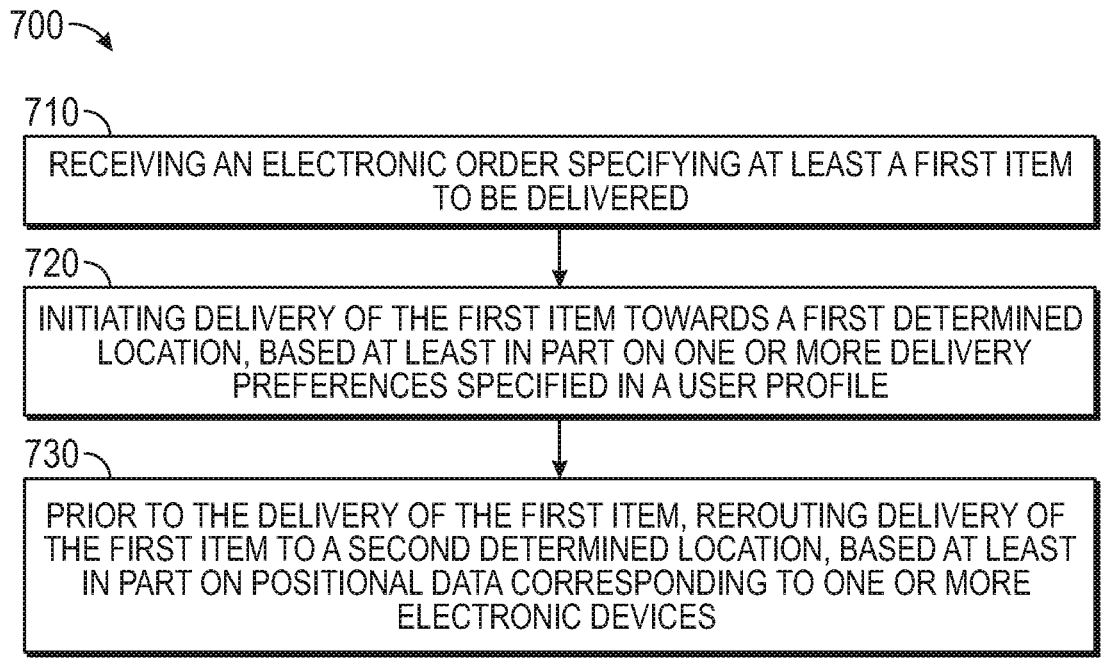
FIG. 7 is a flow diagram illustrating a method for dynamically rerouting delivery of an item, based on positional data received from one or more electronic devices, according to one embodiment described herein.

FIG. 7 is a flow diagram illustrating a method for dynamically rerouting delivery of an item, based on positional data received from one or more electronic devices, according to one embodiment described herein. As shown, the method 700 begins at block 710, where the delivery location determination component 225 receives an electronic order specifying at least a first item to be delivered. The delivery location determination component 225 initiates delivery of the first item towards a first determined location, based at least in part on one or more delivery preferences specified in a user profile (block 720). Prior to the delivery of the first item, the delivery location determination component 225 reroutes delivery of the first item to a second determined location, based at least in part on positional data corresponding to one or more electronic devices (block 730).

Figure 8:
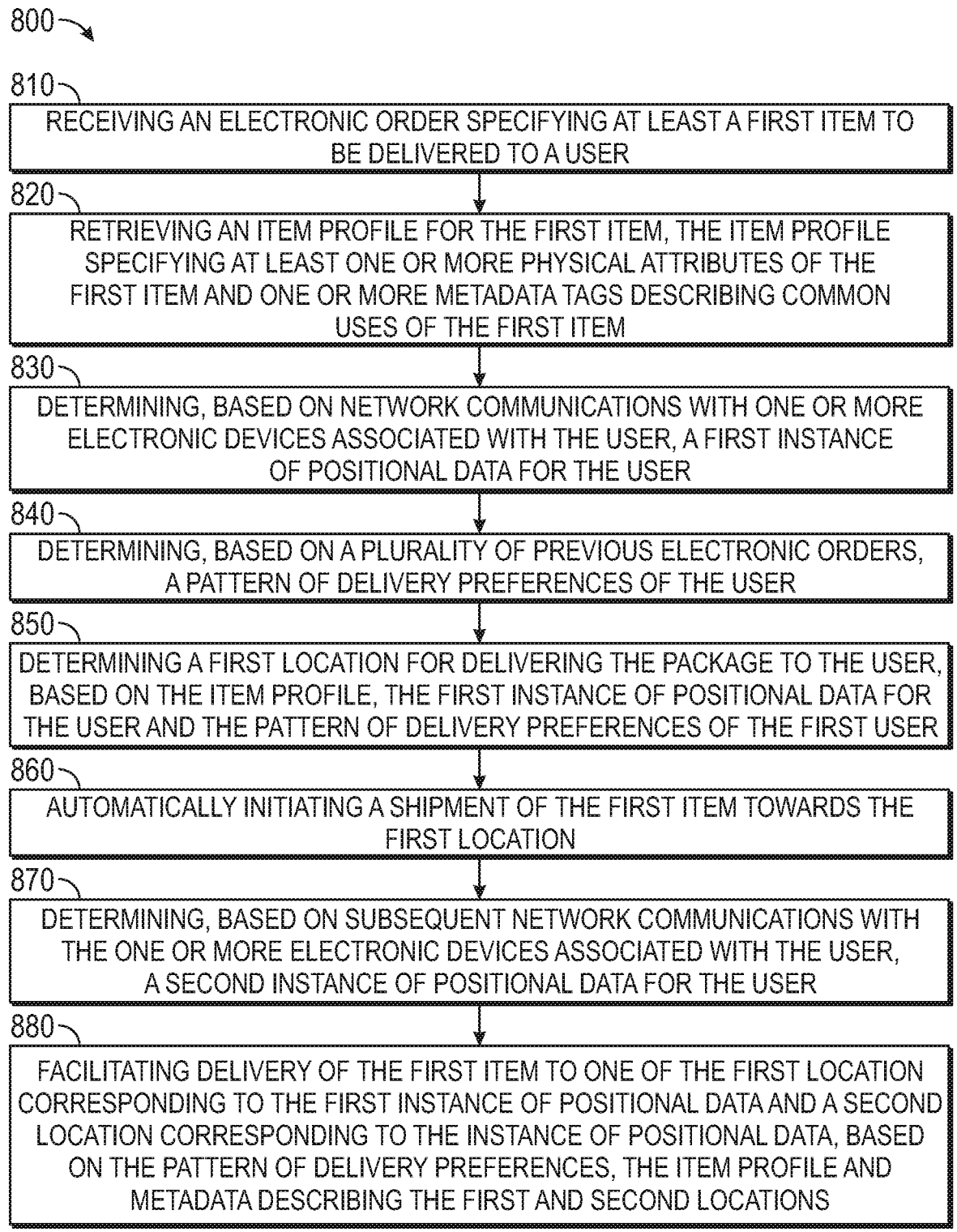
FIG. 8 is a flow diagram illustrating a method for facilitating delivery of an item to a dynamically determined location, according to one embodiment described herein.

FIG. 8 is a flow diagram illustrating a method for facilitating delivery of an item to a dynamically determined location, according to one embodiment described herein. As shown, the method 800 begins at block 810, where the delivery location determination component 225 receives an electronic order specifying at least a first item to be delivered to a user. The delivery location determination component 225 retrieves an item profile for the first item, the item profile specifying at least one or more physical attributes of the first item and one or more metadata tags describing common uses of the first item (block 820). Additionally, the delivery location determination component 225 determines, based on network communications with one or more electronic devices associated with the user, a first instance of positional data for the user (block 830).

The delivery location determination component 225 also determines, based on a plurality of previous electronic orders, a pattern of delivery preferences of the user (block 840). In the depicted embodiment, the delivery location determination component 225 then determines a first location for delivering the package to the user, based on the item profile, the first instance of positional data for the user and the pattern of delivery preferences of the first user (block 850). The delivery location determination component 225 also automatically initiates a shipment of the first item towards the first location (block 860). The delivery location determination component 225 further determines, based on subsequent network communications with the one or more electronic devices associated with the user, a second instance of positional data for the user (block 870). The delivery location determination component 225 facilitates delivery of the first item to one of the first location corresponding to the first instance of positional data and a second location corresponding to the instance of positional data, based on the pattern of delivery preferences, the item profile and metadata describing the first and second locations (block 880).

Figure 9:
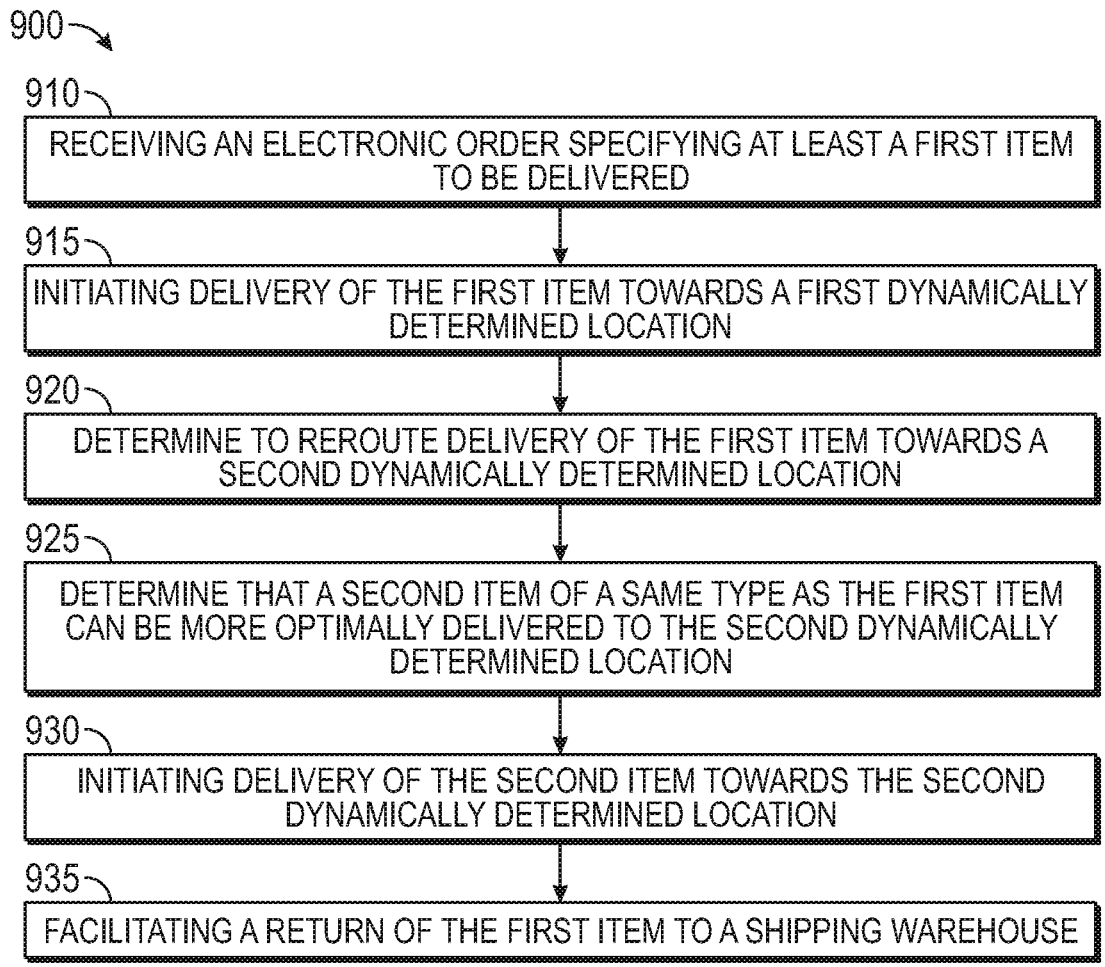
FIG. 9 is a flow diagram illustrating a method of delivering an item to an alternate delivery location, according to one embodiment described herein.

FIG. 9 is a flow diagram illustrating a method of delivering an item to an alternate delivery location, according to one embodiment described herein. As shown, the method 900 begins at block 910, where the delivery location determination component 225 receives an electronic order specifying at least a first item to be delivered. The delivery location determination component 225 initiates delivery of the first item towards a first dynamically determination location (block 915). For example, the delivery location determination component 225 can consider inputs such as a user profile for the item recipient, item data and metadata for the item being ordered, the user's current positional information, and so on, in determining the first delivery location for the item.

At some subsequent moment in time, the delivery location determination component 225 determines to reroute the delivery of the first item towards a second dynamically determined location (block 920). The delivery location determination component 225 determines that a second item of a same type as the first item can be more optimally delivered to the second dynamically determined location (block 925). For example, where the first and second delivery locations are relatively far apart, it may be more efficient to ship a second item of the same item type from a shipping warehouse that is closer to the second delivery location, rather than rerouting the first item to the second location. In the depicted embodiment, the delivery location determination component 225 initiates delivery of the second item towards the second dynamically determined location (block 930). Additionally, the delivery location determination component 225 facilitates a return of the first item to a shipping warehouse (block 935). For example, the delivery location determination component 225 could modify shipping information in the shipping management database 272, such that the first item is returned to the shipping warehouse.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
    receiving a first electronic order specifying at least a first item to be delivered to a first user;
    retrieving a first item profile for the first item, the first item profile specifying at least one or more physical attributes of the first item and one or more metadata tags describing common uses of the first item;
    determining, based on a first plurality of previous electronic orders, a pattern of delivery preferences of the first user;
    determining a first location for delivering the first item to the first user, based on the first item profile and the pattern of delivery preferences of the first user;
    automatically initiating, by operation of one or more computer processors, a shipment of the first item towards the first location;
    determining, based on network communications with one or more electronic devices associated with the first user, an instance of positional data for the first user; and
    after initiating the shipment of the first item towards the first location, facilitating delivery of the first item to a second location corresponding to the instance of positional data, based at least in part on:
        evaluating the pattern of delivery preferences, the one or more physical attributes of the first item, the common uses of the first item, and metadata describing the first and second locations with a machine learning model to determine a likelihood that the second location satisfies a condition for delivery of the first item; and
        determining that the likelihood exceeds a threshold level of likelihood.

2. The method of claim 1, further comprising:
    receiving a second electronic order specifying at least a second item to be delivered to a second user;
    retrieving a second item profile for the second item, the second item profile specifying at least one or more physical attributes of the second item and one or more metadata tags describing common uses of the second item;

determining, based on a second plurality of previous electronic orders, a pattern of delivery preferences of the second user; and determining to deliver the second item to a predefined address specified in a user profile for the second user, based on the pattern of delivery preferences of the second user and the second item profile for the second item.

3. The method of claim 1, wherein automatically initiating, by operation of the one or more computer processors, the shipment of the first item towards the first location comprises:

generating a graphic for a shipping label corresponding to the shipment of the first item towards the first location; and outputting the graphic to a printer device, to generate a label for shipping a package containing the first item.

4. The method of claim 2, wherein facilitating delivery of the first item to the second location further comprises:

determining, based on the pattern of delivery preferences and an item type of the first item specified in the first item profile, that the first user has previously received one or more items of the item type at the second location; and in response, determining to deliver the first item to the second location.

5. The method of claim 1, wherein facilitating delivery of the first item to the second location further comprises:

transmitting one or more instructions to the one or more electronic devices associated with the first user, prompting for a selection between at least the first location and the second location; and upon receiving the selection, facilitating delivery of the first item to the selected location.

6. The method of claim 1, wherein facilitating delivery of the first item to the second location further comprises:

determining a frequency of delivery of items of an item type of the first item specified in the first item profile, based on the first plurality of previous electronic orders; and upon determining that the frequency of delivery is less than a predefined threshold frequency, facilitating delivery of the first item to the second location.

7. A system, comprising:
one or more processors; and
a memory containing computer program code that, when executed by operation of the one or more processors, performs an operation comprising:
receiving an electronic order specifying at least a first item to be delivered;
initiating delivery of the first item towards a first determined location, based at least in part on one or more delivery preferences specified in a user profile; and
prior to the delivery of the first item, rerouting delivery of the first item to a second determined location, based at least in part on:
evaluating (i) positional data corresponding to one or more electronic devices, (ii) metadata describing the second determined location, (iii) metadata describing physical attributes of the first item, and (iv) metadata describing common uses of the first item with a machine learning model to determine a likelihood that the second determined location satisfies a first predetermined condition for delivery of the first item; and
determining that the likelihood satisfies a second predetermined condition.

8. The system of claim 7, wherein initiating delivery of the first item towards the first determined location, based at least in part on the one or more delivery preferences specified in the user profile, comprises:

transmitting a request for current positional data to the one or more electronic devices, the one or more electronic devices corresponding to a first user associated with the electronic order; and receiving, in response to the request, the current positional data from the one or more electronic devices, specifying the first determined location.

9. The system of claim 8, wherein initiating delivery of the first item towards the first determined location, based at least in part on the one or more delivery preferences specified in the user profile, further comprises:

determining that an order history of the first user specifies that the first user has previously purchased one or more items of an item type as the first item;

determining one or more locations that the one or more items were previously shipped to; and determining to deliver the first item to the first determined location, based on the one or more locations.

10. The system of claim 7, wherein prior to the delivery of the first item, rerouting delivery of the first item to the second determined location, based at least in part on the positional data corresponding to the one or more electronic devices, comprises:

after initiating delivery of the first item towards the first determined location, transmitting a request for current positional data to the one or more electronic devices, the one or more electronic devices corresponding to a first user associated with the electronic order; and receiving, in response to the request, the current positional data from the one or more electronic devices, specifying the second determined location.

11. The system of claim 10, wherein prior to the delivery of the first item, rerouting delivery of the first item to the second determined location, based at least in part on the positional data corresponding to the one or more electronic devices, further comprises:

transmitting one or more instructions to the one or more electronic devices associated with the first user, to prompt for a selection between at least the first determined location and the second determined location; and upon receiving a selection of the second determined location, facilitating delivery of the first item to the second determined location.

12. The system of claim 7, the operation further comprising:

accessing one or more social media sources corresponding to the user profile;

processing a plurality of user updates from the one or more social media sources, using a trained machine learning model, to determine an estimated likelihood that the second determined location is a delivery location for the first item; and upon determining that the estimated likelihood exceeds a threshold level of likelihood, determining to reroute delivery of the first item to the second determined location.

13. The system of claim 7, wherein the physical attributes of the first item comprise a measure of weight of a delivery package containing the first item, package dimensions of the delivery package, whether the first item is classified as a perishable item, and whether the first item is classified as a frozen item.

14. The system of claim 7, wherein, prior to the delivery of the first item, rerouting delivery of the first item to the second determined location, comprises determining to reroute the delivery of the first item to the second determined location, further based at least in part on a received indication that a recipient of the first item has requested expedited delivery of the first item, a time of year of the delivery, and a region in which the first determined location is located.

15. A non-transitory computer-readable medium containing computer program code that, when executed by operation of one or more computer processors, performs an operation comprising:
   receiving an electronic order specifying at least a first item to be delivered using a dynamic item delivery mechanism;
   determining a first location corresponding to one or more electronic devices;
   initiating delivery of the first item to the first location, based in part on evaluating (i) metadata describing the first location and (ii) metadata describing physical attributes of the first item, in view of one or more predefined control rules for the dynamic item delivery mechanism; and
   after initiating the delivery of the first item to the first location and prior to the delivery of the first item:
      determining a second location corresponding to the one or more electronic devices; and
      rerouting the delivery of the first item to the second location based in part on:
         evaluating (i) metadata describing the second location, (ii) the metadata describing physical attributes of the first item, and (iii) metadata describing common uses of the first item, in view of the one or more predefined control rules for the dynamic item delivery mechanism; and
         determining that the metadata describing the second location, the metadata describing common uses of the first item, and the metadata describing the physical attributes of the first item satisfy at least a first predefined control rule of the one or more predefined control rules.

16. The non-transitory computer-readable medium of claim 15, wherein initiating delivery of the first item to the first location comprises upon determining to deliver the first item to the first location, transmitting a notification of the delivery to a client device associated with the electronic order.

17. The non-transitory computer-readable medium of claim 15, wherein initiating delivery of the first item to the first location is further based on determining that the metadata describing the first location, the metadata describing common uses of the first item, and the metadata describing physical attributes of the first item satisfy at least a second predefined control rule of the one or more predefined control rules.

18. The non-transitory computer-readable medium of claim 15, wherein initiating delivery of the first item to the first location comprises:
   transmitting one or more instructions to the one or more electronic devices to prompt for a selection between at least the first location and a third location, wherein the third location is a predefined address specified in a user profile associated with the electronic order and the one or more electronic devices are associated with the electronic order; and
   upon receiving a selection of the first location, facilitating delivery of the first item to the first location.

19. The non-transitory computer-readable medium of claim 15, wherein rerouting the delivery of the first item comprises:
   determining that an order history of a user associated with the electronic order specifies that the user has previously purchased one or more items of a same item type as the first item;
   determining one or more locations that the one or more items were previously shipped to; and
   determining to deliver the first item to the second location, based on the one or more locations.

20. The non-transitory computer-readable medium of claim 15, wherein rerouting the delivery of the first item comprises:
   determining a region in which the first location is located;
   determining a frequency at which one or more items were previously shipped to the determined region; and
   determining to deliver the first item to the second location based at least in part on the determined frequency.

* * * * *